April 15, 1969 A. A. SNAPER 3,439,174

ELECTROLYTIC IMAGE TRANSDUCER

Filed March 7, 1966

INVENTOR.
ALVIN A. SNAPER
BY Allen E. Botney
ATTORNEY

United States Patent Office 3,439,174
Patented Apr. 15, 1969

3,439,174
ELECTROLYTIC IMAGE TRANSDUCER

Alvin A. Snaper, 9722 Casaba, Chatsworth, Calif. 91311
Filed Mar. 7, 1966, Ser. No. 532,210
Int. Cl. H01j 31/50
U.S. Cl. 250—213 3 Claims

ABSTRACT OF THE DISCLOSURE

The present invention is an image-forming mechanism in which a light image is transformed or converted to a semi-permanent type of image, semi-permanent in the sense that the same image area can be used on successive occasions with each image being retained thereon as long as is necessary or desired. The mechanism is based on an electrolytic process and is constructed in a laminar or sandwich arrangement of several layers among which are included a transparent substrate, a transparent electrode, a transparent photoconductor, an electrolyte layer and a metallic anode. The light image is transformed by the deposition of a corresponding metallic image on the photoconductive layer.

The present invention relates in genral to image-forming devices and more particularly relates to image transducer apparatus in which an image is formed by electrolytic deposition in response to a corresponding light image. As is well known, there are many different ways to form an image, such as by recording it on photographic film or by presenting it on the face of a cathode ray tube. However, there are a number of limitations to these earlier image-forming techniques and the present invention is intended to fill the gap left by the prior art. Thus, referring to the techniques mentioned above by way of example, an image formed on a frame of photographic film is, for all practical purposes, a permanent image, by which is meant that if additional information is to be stored, that is to say, if additional images are to be formed, then additional film must be used. Stated differently, the same frame of film cannot be used over and over again. As for the cathode ray tube, while different images may consecutively be formed on the face of the tube, each image is retained for only a relatively short period of time before it disappears. Accordingly, there has been a long-felt need for an image-forming apparatus in which the same image area can be used on successive occasions with each image being retained thereon as long as is necessary or desired.

The present invention fulfills this need and the concept thereof is based on an electrolytic process in which a data point is formed by means of electroplating techniques. Stated differently, the basic principle involves the transfer of metallic ions in an electrolyte solution and the deposition of metallic particles onto a transparent electrode. For this purpose, the electrolytic process commences when an appropriate direct-current electrical potential or voltage is applied, and an image is formed by controlling the electroplating current at any given point either by a photoconductor or the magnitude and duration of the applied voltage.

More specifically, a preferred embodiment of the invention comprises a sandwich arrangement of several layers, among which are included a transparent substrate, a transparent electrode, a transparent photoconductor, an electrolyte layer and a metallic anode. Basically, when light from an external source impinges on the face of the transparent substrate, it is transmitted through the substrate, through the transparent electrode and thereafter through the transparent photoconductor. With a direct-current voltage applied across the two electrodes, the loss of resistance by the photoconductor in response to the light allows a current to flow through the electrolyte layer. As a result, the electrolyte, which may be either a solution or a gel, permits the transfer of metallic ions from the anode to the surface of the photoconductor. Thus, by the process of electrodeposition (plating), a metallic image is produced whose variations are in direct proportion to the applied unit light intensity values and this image may be viewed through the aforesaid transparent substrate. Viewing contrast, sensitivity, and other parameters, may be controlled by the choice of construction materials and/or by the voltage applied. In addition, the image obtained may be retained indefinitely by opening the electrical circuit or it may be erased completely by reversing electrode polarity.

In the preferred embodiment described briefly above, the image is viewed or read out by reflection, that is to say, from the same side as the incident light source. However, this embodiment may be modified to produce a transparent cell which may be read out by either transmission or reflection. More specifically, in the modified configuration, the metallic anode is replaced by a transparent electrode on a transparent substrate, with the result that a completely transparent cell is formed which may be read out from either side. On the other hand, while read-in is possible from either side, read-in from the photoconductor side would be most efficient.

Although the chief advantages of apparatus according to the present invention have already been suggested, it should nevertheless also be mentioned that by selectively controlling the parameters of operation, such as input, voltage, current, exposure and cycling, the cell can be made to perform various functions, among which are:

(a) Continuous tone imaging;
(b) High contrast imaging;
(c) Negative/positive display;
(d) Projection display;
(e) Light modulation;
(f) Reticle or grid display;
(g) Optical computation; and
(h) Variable spectral filtering.

It is, therefore, an object of the present invention to provide an apparatus by means of which images may be formed by the process of electrodeposition.

It is an additional object of the present invention to provide means by which a high contrast or continuous tone image may be formed by the electrolytic deposition of a translucent or opaque material on a transparent, translucent, or opaque surface in response to modulated light input imaging.

The novel features, which are believed to be characteristic of the invention, both as to its organization and method of operation, together with further objects and advantages thereof, will be better understood from the following description considered in connection with the accompanying drawing in which embodiments of the invention are illustrated by way of example. It is to be expressly understood, however, that the drawing is for the purpose of illustration and description only and is not intended as a definition of the limits of the invention.

FIGURE 3*a* illustrates a possible modification of the FIG. 3 apparatus in which a wire-mesh grid structure is substituted for one of the electrodes therein.

Figure 1:
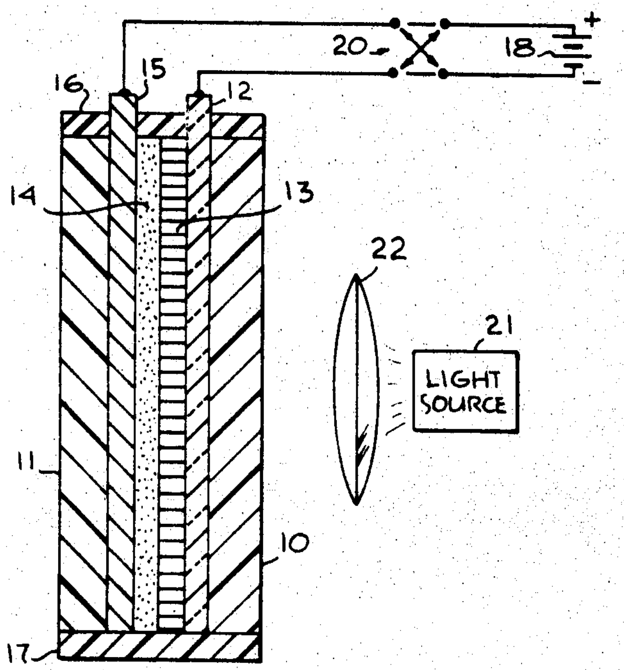
FIGURE 1 is a cross-sectional view illustrating the mechanical construction of a reflection reading electrolytic image transducer according to a first embodiment of the present invention.

For a consideration of the invention in detail, reference is now made to the drawing wherein like or similar parts or elements are given like or similar designations throughout the several figures. In FIG. 1, the embodiment therein is shown to include a pair of substrates 10 and 11 between which is sandwiched a plurality of four thin layers designated 12–15. Layer 12 is a transparent electrode positioned immediately adjacent substrate 10 which, for reasons that will more clearly be understood later, is likewise made of a transparent material, such as glass. For electrode 12, stannic oxide is an example of a conductive transparent material that may be used. Layer 15 is a second electrode which, like the first electrode, is positioned immediately adjacent substrate 11. However, unlike the first electrode, layer 15 is preferably made of metal and, therefore, in this embodiment is not transparent. Between electrodes 12 and 15 are mounted the remaining two layers 13 and 14, with layer 13, made of a transparent photoconductor material, being positioned adjacent electrode 12 and layer 14, formed of an electrolytic material, being positioned adjacent electrode 15. The substrates are needed only to support and protect the four layers therebetween and, therefore, in keeping with these purposes, the substrates themselves may also be quite thin.

To complete the structure, non-conductive protective elements 16 and 17 are respectively mounted at the top and bottom thereof, so that layers 12–15 are completely enclosed by the cell structure formed by substrates 10 and 11 and top and bottom elements 16 and 17, except that electrodes 12 and 15 are permitted to protrude somewhat through the top element, as shown in the figure, in order to facilitate electrical connection thereto. Finally, completing the embodiment is a DC power supply, such as a battery 18, and a polarity reversing switch 20 respectively connected between the positive and negative terminals of the battery and the two electrodes 12 and 15.

Although not a part of the present invention, a light source and an optical system are also shown in the figure, the light source being designated 21 and the optical system being designated 22. Light source 21 may be an ordinary light bulb, a fluorescent lamp, or the like, whereas optical system 22 schematically represents not only a lens arrangement, but also an image source by means of which a pattern of light may be projected toward substrate 10. Merely by way of example, one kind of image source would be an ordinary frame of film on which information has been recorded. In other words, light source 21 and optical system 22 together schematically represent some means by which a light image is projected toward substrate 10.

In its operation, the aforedescribed image transducer mechanism is first activated by the closing of switch 20, which thereby applies a voltage across electrodes 12 and 15, the positive potential or high side of the voltage being applied to electrode 15. With no light striking it, photoconductor 13 presents a relatively high resistance to the applied voltage and, therefore, very little, if any, current flow occurs. The desired scene or image is now brought into alignment with optical system 22, which collects the emitted light and projects it through substrate 10 and electrode 12 to focus it onto photoconductor 13. The light striking photoconductor 13 immediately produces a localized reduction in electrical resistance across the circuit, thereby now permitting a correspondingly localized electric current flow between the two electrodes 12 and 15. At this time, within electrolyte 14, metallic ions start to leave electrode 15 and travel to the surface of photoconductor 13. Thus, by the process of electrodeposition (plating), a metallic image is produced on the surface of photoconductor 13 in direct proportion to the localized input light pattern and intensity from the subject scene or image.

This metallic image may be viewed through substrate 10 and electrode 12 by an observer's eye located to the front of the device, especially so since either the light source and optical system on the one hand or the image transducer device itself on the other hand can be removed once the image has been received and recorded by the transducer. The image may be retained indefinitely by opening the electrical circuit, or completely erased merely by again illuminating photoconductor 12 and at the same time reversing the polarity of the voltage through the polarity-reversing switch. Upon erasure, the image transducer plate or cell is then ready to be used again in the above-described manner to record a second image. It can thus be seen that by means of the present invention, the cycle of recording a viewable image may be repeated over and over again with respect to the same plate area.

As previously mentioned, viewing contrast, sensitivity, and other parameters are controlled by proper choice of construction materials and/or the voltage applied. For example, to enhance viewing contrast, a non-reflective conductive compound, such as silver oxide or the like, may be used in the construction of electrode layer 15. As a result, the image formed on photoconductor 13 would be a reflective metallic silver which, in turn, would result in a reflective image viewed against a contrasting background. Several precious metals such as silver, gold, rhodium and platinum may be used as plating materials in such a system. Of course, the more common metals, such as copper or zinc, may also be used and have faster inherent response times to image formation but they are, however, somewhat more reactive in nature. As for the other elements in the device, electrode 12 may be a crystalline film of stannic oxide, the photoconductor material in layer 13 may be composed of cadmium sulphide, and electrolytic layer 14, which may be in the form of a liquid or a gel, may be a silver cyanide or a copper sulphate electrolyte solution. With respect to the specific materials mentioned above, it should be emphasized that they have been mentioned merely by way of example and that other materials of like characteristics may also be utilized with good effect.

Figure 2:
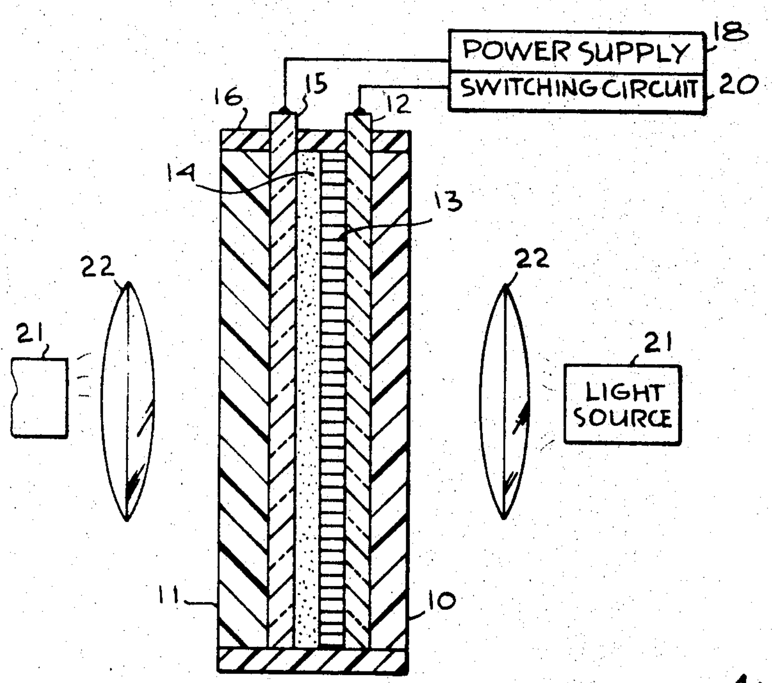
FIGURE 2 illustrates, in cross-section, a modification of the FIG. 1 apparatus to produce a transparent cell which may be read out either by transmission or reflection.
Figure 3:
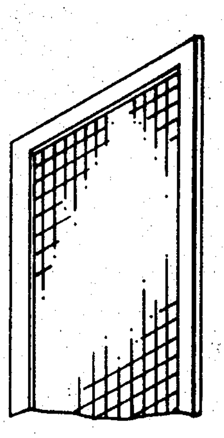

The image transducer shown in FIG. 1 is a reflection reading type. However, the FIG. 1 device may be modified in the manner shown in FIG. 2 to form a transparent transducer that may be read out by either through-transmission or by reflection. More particularly, this modification may be achieved by replacing the metallic eectrode 15 with a transparent electrode and, likewise, using a transparent material for substrate 11. Metal ions for deposition would be supplied by the electrolyte which, as was mentioned earlier, may be in the form of a cyanide complex of the desired substance. Thus, a completely transparent cell is thereby formed which may be read in and read out from either side. It should be noted, however, that although bi-surface read-in is possible, read-in from the photoconductor side would be more efficient. For the purpose of representing that read-in may be accomplished from either side of the device, a light source and an associated optical system are shown on both sides of it.

Figure 3:
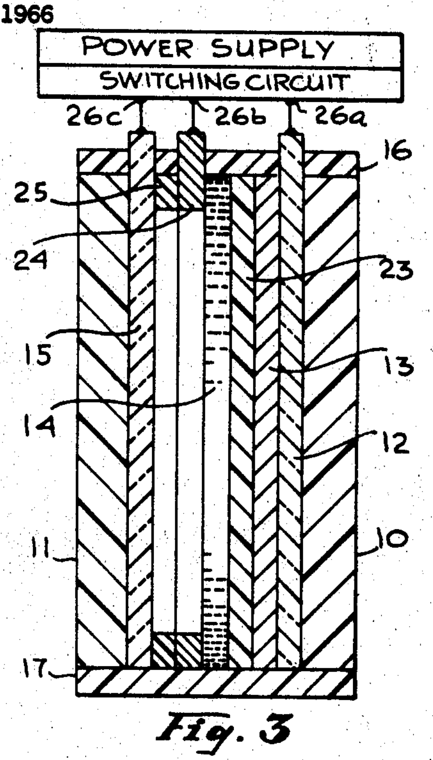
FIGURE 3 is a second embodiment, illustrated in cross-section, of a transparent system for see-through applications.

Another embodiment of a completely transparent or "see-through" electrolytic image transducer according to the present invention is shown in FIG. 3 to which reference is now made. As shown therein, this embodiment also includes a pair of transparent substrates 10 and 11, a pair of transparent electrodes 12 and 15, a photoconductive layer 13 and a metal ion or electrolytic plating solution 14. However, should it be necessary, there is also included in this embodiment a semi-permeable membrane 23 positioned and mounted between layers 13 and 14 which is intended to protect the photoconductor material of layer 13 from the adverse effects of direct chemical contact with the metal ion or plating solution of layer 14. This embodiment further includes a third electrode 24, which may be called a reverse plating or deplating electrode, and an insulating spacer 25 positioned and mounted between electrodes 15 and 24 for the purpose, as its name implies, of insulatively spacing them apart. As may be seen from the figure, electrode 24 and spacer 25 may be nothing more than frames in their structural configuration.

The electrical connections are somewhat different in this embodiment as well. More specifically, three electric lines, rather than two, are involved here, one to each electrode, as before, they are connected through a suitable switch mechanism to an appropriate voltage source. However, for sake of convenience, the switch and voltage source are not shown in any detail in this figure, nor are the light source and optical system shown for the same reason. The electric line terminals are respectively designated *26a*, *26b*, and *26c*.

The operation of this embodiment is substantially the same as heretofore described. Thus, to plate an image, the switch is thrown so that terminal *26c* and, therefore, electrode 15, is connected to the corresponding positive terminal of the voltage source. The apparatus is then used as before, namely, by projecting a light image onto the photoconductive layer so that a corresponding metal image may be plated thereon. To deplate or erase the resulting image, the polarity reversing switch is thrown so that terminal *26a* is now connected instead to the positive terminal of the voltage source and terminal *26b* which leads to electrode 24, is connected into the circuit by being connected to the negative terminal of the voltage source. Terminal *26c*, on the other hand, is completely disconnected from the circuit. With the described voltage applied between electrodes 12 and 24, the metal image very quickly disappears thereafter and the device is ready for another cycle of operation.

Although a number of particular arrangements of the invention have been illustrated above by way of example, still other arrangements are possible and, therefore, it is not intended that the invention be limited thereto. For example, deplacing electrode 24, which is shown in the configuration of a frame in FIG. 3, may also be in the form of a wire mesh grid whose structure is illustrated in FIG. 3(*a*). Accordingly, the invention should be considered to include any and all modifications, alterations or equivalent arrangements falling within the scope of the annexed claims.

Having thus described the invention, what is claimed is:

1. Image-forming apparatus comprising a photoconductive layer and an electrolytic layer mounted in a sandwich arrangement in face-to-face relationship, said layers being in physical contact with one another throughout their face-to-face surfaces; means for applying direct-current voltages between the outer free surfaces of said layers, said means including first and second electrically conductive electrode layers that are transparent to light, said photoconductive and electrolytic layers being sandwiched between said first and second electrode layers in face-to-face relationship therewith with the photoconductive layer being adjacent said first electrode layer; a third transparent electrode layer mounted between said electrolytic layer and said second electrode layer; and an insulating spacer element mounted between said second and third electrode layers.

2. The image-forming apparatus defined in claim 1 wherein said apparatus further includes means for applying direct-current voltages between said electrode layers, said means including additional means for selectively applying a first voltage between said first and second electrode layers and a second voltage between said first electrode layer and said third electrode layer.

3. The image-forming apparatus defined in claim 2 wherein said first voltage is a negative potential on said first electrode layer and a positive potential on said second electrode layer, and said second voltage is a positive potential on said first electrode and a negative potential on said third electrode layer.

References Cited

UNITED STATES PATENTS

| | | | |
|---|---|---|---|
| 1,907,124 | 5/1933 | Ruben | 250—213 X |
| 2,883,556 | 4/1959 | Jenny et al. | 250—213 |
| 3,107,303 | 10/1963 | Berkowitz | 250—213 |
| 3,127,331 | 3/1964 | Neher | 204—18 |
| 3,142,562 | 7/1964 | Blake | 346—74 |

WALTER STOLWEIN, *Primary Examiner.*

U.S. Cl. X.R.

204—2; 346—74